(12) United States Patent
Yuan et al.

(10) Patent No.: US 8,320,722 B1
(45) Date of Patent: Nov. 27, 2012

(54) NON-LINEAR OPTICAL GRATING

(75) Inventors: Hongxing Yuan, Fremont, CA (US);
Shing Lee, Fremont, CA (US);
Zhongyan Wang, San Ramon, CA (US);
Jinshan Li, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 237 days.

(21) Appl. No.: 12/759,491

(22) Filed: Apr. 13, 2010

(51) Int. Cl.
*G02B 6/34* (2006.01)
*G02F 1/295* (2006.01)

(52) U.S. Cl. ............................................ 385/37; 385/10
(58) Field of Classification Search ........................ None
See application file for complete search history.

(56) References Cited

U.S. PATENT DOCUMENTS

| | | | |
|---|---|---|---|
| 4,743,083 A | 5/1988 | Schimpe | |
| 4,930,132 A | 5/1990 | Shimizu et al. | |
| 4,991,919 A | 2/1991 | Nishiwaki et al. | |
| 5,031,993 A | 7/1991 | Asthana et al. | |
| 5,204,516 A | 4/1993 | Opheij | |
| 5,631,885 A | 5/1997 | Brazas, Jr. | |
| 6,748,138 B2 * | 6/2004 | Wang et al. | 385/37 |
| 6,876,792 B2 * | 4/2005 | Kurihara et al. | 385/37 |
| 7,046,892 B2 | 5/2006 | Yoshikawa et al. | |
| 7,194,164 B2 | 3/2007 | Iazikov et al. | |
| 7,218,817 B2 * | 5/2007 | Magnusson et al. | 385/37 |
| 7,233,563 B2 | 6/2007 | Ueki et al. | |
| 7,292,753 B2 * | 11/2007 | Cohen et al. | 385/37 |
| 7,639,911 B2 * | 12/2009 | Lee et al. | 385/37 |
| 8,200,054 B1 | 6/2012 | Li et al. | |
| 2002/0176463 A1 | 11/2002 | Bullington et al. | |
| 2003/0077039 A1 * | 4/2003 | Kurihara et al. | 385/37 |

OTHER PUBLICATIONS

Dirk Taillaert, et al., "Grating Couplers for Coupling between Optical Fibers and Nanophotonic Waveguides", Japanese Journal of Applied Physics, vol. 45, No. 8A, 2006, pp. 6071-6077.
Lawrence C. West, et al., "Non Uniform Grating Couplers for Coupling of Gaussian Beams to Compact Waveguides", Reprint of the final paper published in the Integrated Photonics Research Technical Digest, Optical Society of America, 1994, 4 pages. Downloaded from http://www.wai.com/software_pdf/emflex-94OSA_nonUniform.pdf, on Apr. 12, 2010.
Sakoolkan Boonruang, et al., "Novel design to increase the angular tolerance of grating resonance devices at oblique incidence", Optical Society of America, 2007, 2 pages. Downloaded from http://ultralaser.iphy.ac.cn/cleo/data/papers/CThP1.pdf, on Apr. 12, 2010.
Stijn Scheerlinck, et al., "Efficient, broadband and compact metal grating couplers for silicon-on-insulator waveguides," Optics Express, vol. 15, No. 15, Jul. 23, 2007, pp. 9625-9630.

* cited by examiner

*Primary Examiner* — Tina Wong

(57) ABSTRACT

A method and system for providing an optical grating are described. The optical grating is configured for light of a wavelength. The optical grating includes a top cladding, a core, and bottom cladding. The core resides between the bottom cladding and the top cladding. The core includes a plurality of discrete ridges spaced apart by a nonlinear pitch. The light traverses the top cladding before the core and has a plurality of angles of incidence with the core. The nonlinear pitch of the core is larger for a larger angle of incidence of the plurality of angles of incidence.

20 Claims, 7 Drawing Sheets

Bottom Cladding Thickness

Distance Along Grating

NON-LINEAR OPTICAL GRATING

BACKGROUND

Optical gratings are used for light coupling and delivery in a variety of optical systems. For example, in energy assisted magnetic recording (EAMR) electromagnetic radiation (light) is provided from a laser to a conventional grating. Typically, the light provided from the laser is in the optical range of the spectrum. The conventional grating is configured for a particular wavelength in the spectrum. Typically this means that the conventional grating actually functions in a range of wavelengths around the particular wavelength. The conventional grating couples light of the particular wavelength from the laser to a waveguide. The light from the waveguide is typically provided to a near-field transducer (NFT) and used to heat a spot on a magnetic recording media. Data is magnetically written to the spot while the spot is heated.

FIG. 1 depicts such a conventional grating 10 formed on a substrate 12. The conventional grating 10 may be used in magnetic recording applications. The conventional grating 10 includes a conventional optical core 14. Further, top and bottom cladding may also be included. However, such layers are not depicted for simplicity. The conventional core includes ridges 16 interspersed with troughs 18 and spaced apart a pitch, d. The conventional grating 10 is configured for use with light 20 having a wavelength, λ. The light 20 is a beam represented by rays 22, 24, and 26. The light 20 is generated by a laser and travels to the conventional grating 10. Central ray 22 corresponds to the general direction in which the light 20 travels. However, the light 20 from the laser is also characterized by a divergence represented by angle φ. Thus, the rays 24 and 26 diverge from the central ray 22 by the angle φ. The conventional grating 10 couples the light 20 into a waveguide (not shown), which redirect the light 20 for use in writing data to a media (not shown).

FIG. 2 depicts a conventional method 50 for fabricating a conventional grating such as the conventional grating 10. The core materials, such as $Ta_2O_5$ are deposited, via step 52. A photoresist mask is provided on the core material, via step 54. The photoresist mask has a series of lines interleaved with apertures. The core material is etched, via step 56. Thus, the pattern of the photoresist mask is transferred to the core material. The conventional core 14 may thus be fabricated.

Although the conventional grating 10 and method 50 function, improvements are desired if the beam is not collimated. The coupling efficiency of a grating is a measure of the losses in optical energy between light input to the grating and light output by the grating. A higher coupling efficiency translates to lower losses in a grating. Thus, a higher coupling efficiency is desired. In order to achieve high coupling efficiency in a grating, the geometry of the grating, such as the pitch, depth, and shape of ridges and troughs in a grating are closely controlled. In the conventional grating 10, the pitch, d is generally set to optimize coupling efficiency for the wavelength, λ, and the principal angle of incidence γ1. However, because of the divergence, the rays 22, 24, and 26 are incident upon the grating 10 at different angles. For example, central ray 22 has an angle of incidence with the core 14 of γ1. The ray 24 has an angle of incidence with the core 14 of γ2. The ray 26 has an angle of incidence with the core 14 of γ3. As shown in FIGS. 1, γ1, γ2, and γ3 may differ. Similarly, portions of the light 20 between the rays 24 and 26 have varying angles of incidence. As a result, different portions of the light 20 are coupled into the conventional grating 10 with varying efficiency. Further, the conventional method 50 may be limited in its ability to provide the desired conventional grating 10. In the method 50, the depths of the troughs 18 may depend upon the pitch, d. Thus, use of the conventional method 10 may result in a conventional grating 10 having troughs 18 and ridges 16 that differ in width, depth, and profile. Further, the pitch of the conventional grating 10 that is achievable using the conventional method 50 may be limited by the depth of the troughs 18. This may adversely affect the ability to configure the conventional grating 10 for the desired wavelength, angle of incidence, and divergence. The optical efficiency of the conventional grating 10 may, therefore, degrade.

BRIEF SUMMARY OF THE INVENTION

A method and system for providing an optical grating are described. The optical grating is configured for light of a wavelength. The optical grating includes a top cladding, a core, and bottom cladding. The core resides between the bottom cladding and the top cladding. The core includes a plurality of discrete ridges spaced apart by a nonlinear pitch. The light traverses the top cladding before the core and has a plurality of angles of incidence with the core. The nonlinear pitch of the core is larger for a larger angle of incidence of the plurality of angles of incidence.

DETAILED DESCRIPTION OF THE EMBODIMENTS OF THE INVENTION

Figure 1:
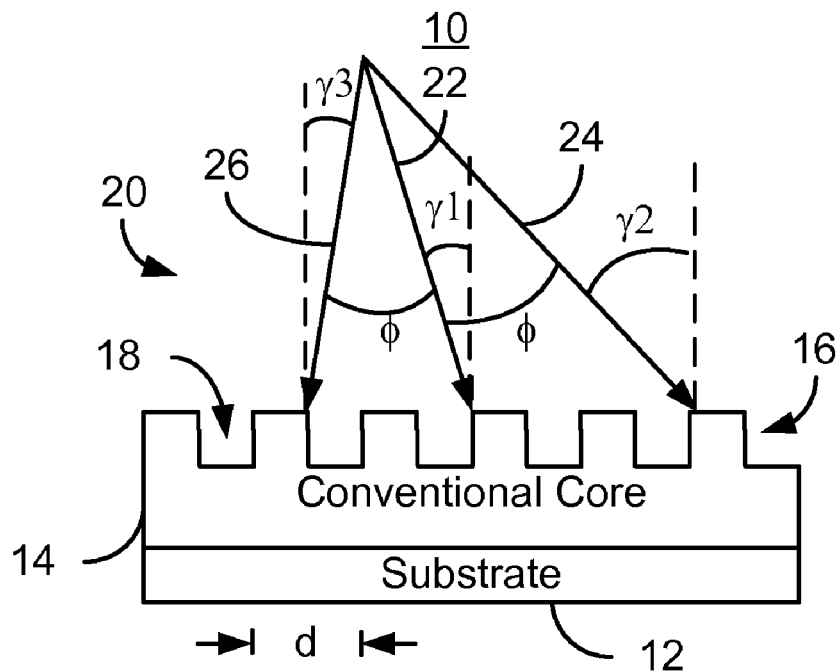
FIG. 1 is a diagram depicting a conventional grating.
Figure 2:
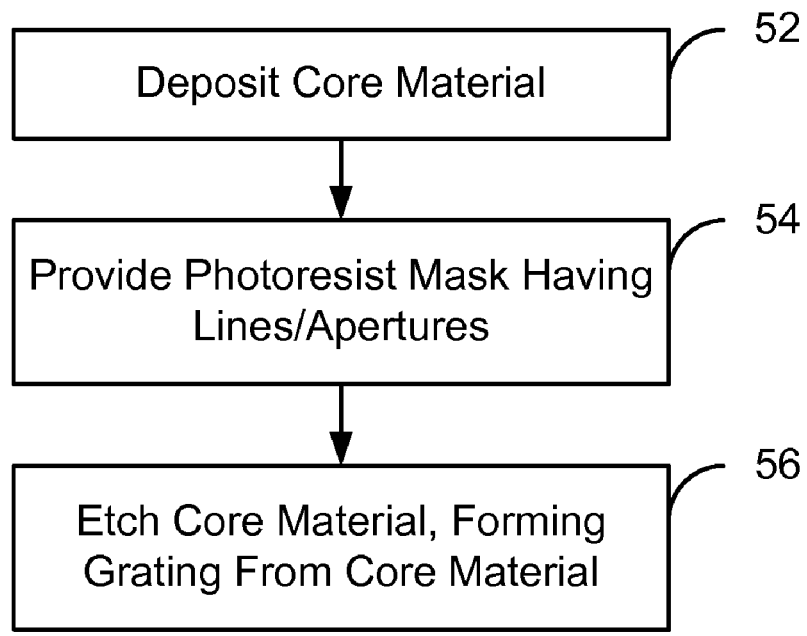
FIG. 2 is a flow chart depicting a conventional method for fabricating an optical grating.
Figure 3:
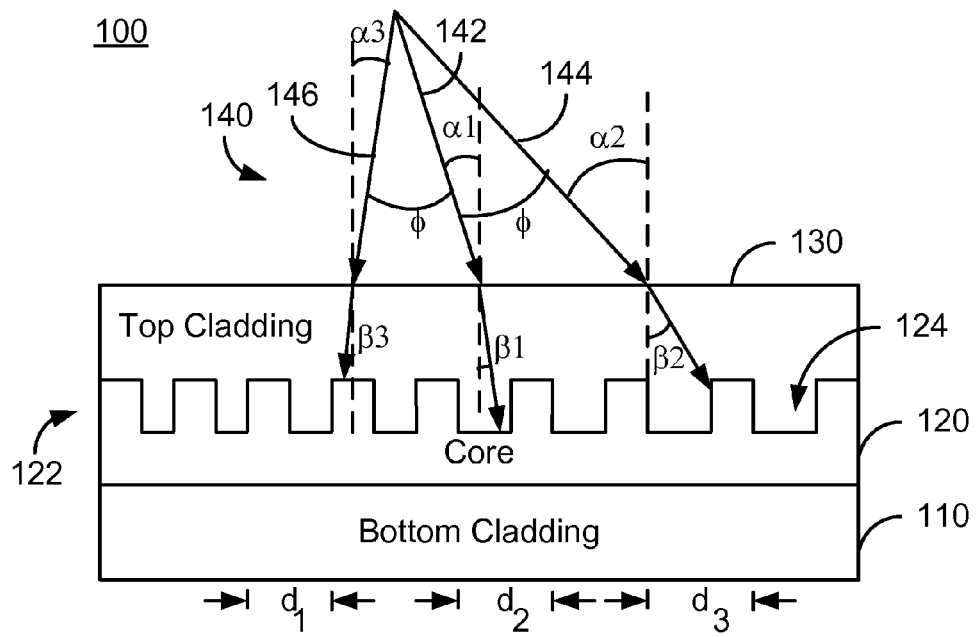
FIG. 3 is a diagram depicting an exemplary embodiment of an optical grating.

FIG. 3 is a diagram depicting an exemplary embodiment of an optical grating 100. FIG. 3 is not to scale. The optical grating 100 may be used in an EAMR head. For example, the optical grating 100 may be incorporated into the optics of an EAMR write transducer. However, in other embodiments, the optical grating 100 may be used in another application. The optical grating 100 includes a bottom cladding layer 110, a core 120, and a top cladding layer 130. The cladding 110 and 130 and the core 120 are desired to transmit light 140. However, the indices of refraction of the cladding layers 110 and 130 differ from the index of refraction of the core 120. Further, in some embodiments, the index of refraction of the bottom cladding 110 is the same as the top cladding 130. In such embodiments, the bottom cladding 110 and top cladding 130 may be composed of the same material, such as $Al_2O_3$. However, in other embodiments, the bottom cladding 110 and top cladding 130 may include different materials and/or have different indices of refraction. The bottom cladding 110 is termed "bottom" because in FIG. 3, the bottom cladding 110 resides under the top cladding 130. Thus, the bottom cladding 110 may be closer to a substrate (not shown) than the top cladding 130. However, in other embodiments, the relationship might be reversed. In some embodiments, the cladding is desired to be greater than five hundred nanometers thick.

The core 120 is formed of another material, such as $Ta_2O_5$. The core 120 includes a series of discrete ridges 122 separated by troughs 124. The ridges 122, and thus the troughs 124, are characterized by a nonlinear pitch. As used herein, a nonlinear pitch is a pitch which varies along the grating 100. Thus, the pitch is $d_1$ near one portion of the grating, $d_2$ at another portion of the grating, and $d_3$ at yet another portion of the grating 100. Further, the pitch may vary between d1, d2 and $d_3$ in intermediate regions. In some embodiments, the pitch increases monotonically in one direction along the grating 100. However, in other embodiments, the pitch may vary in another manner. In the embodiment shown, the height of the ridges 122/depths of the troughs 124 are the same. In addition, the width of each ridge 122 is the same. However, in other embodiments, the widths and/or heights of the ridges 122 may differ. In some embodiments, the core 120 has a thickness of at least one hundred twenty and not more than two hundred nanometers.

The grating 100 is used with light 140. The light 140 is characterized by a wavelength, $\lambda$, for which the grating 100 is configured. However, the grating 100 may operate for other wavelengths in a range around $\lambda$. The light 140 may originate in a laser (not shown), for example a laser diode used in an EAMR disk drive. The light 140 is shown by rays 142, 144, and 146. The ray 144 is a central ray and corresponds to an angle of incidence α1 with the grating 100. The angle of incidence α1 may be considered to be the principal angle of incidence for the light 140. The beam of light 20 has a divergence, corresponding to angle $\phi$. Thus, the ray 24 has an angle of incidence of α2 with the grating 100. The ray 26 has an angle of incidence of α3 with the grating 100. Because light may be refracted by the top cladding 130, the angles of incidences of the light 140 differ for the core 120 than for the top gladding 130. Thus, the central ray 144 has an angle of incidence β1 with the core 120. The ray 124 has an angle of incidence of β2 with the core 120. The ray 126 has an angle of incidence of β3 with the core 120.

As discussed above, the pitch of the grating 100 is nonlinear. More specifically, the pitch depends upon not only the wavelength, but also the angle of incidence. In some embodiments, the pitch increases with increases in wavelength of the light 140 used. In some embodiments, the pitch is larger for a larger angle of incidence for the light 140. As such, the pitch of the grating 100 depends not only upon characteristics of the light used, such as the wavelength and beam divergence, $\phi$, but also on the orientation of the source of the light 140. For example, assume that the light source is oriented as is shown in FIG. 3. Thus, there is some divergence, $\phi$, for the beam and the light travels in a particular direction toward the grating 100. In the configuration shown in FIG. 3, the angle of incidence β2 is greater than the angle of incidence β1. However, due to the direction of the light 140, the angle of incidence β2 is greater than the angle of incidence β1. Thus, the angles of incidence β1, β3, and β3, as well as angles of incidence α1, α2, and α3, are due to the configuration between the source of the light 140 and the grating 100 as well as the divergence of the beam, $\phi$. As can be seen in FIG. 3, the pitch near $d_1$ is smallest at the smallest angle of incidence, β3. The pitch increases to $d_2$ for the next larger angle of incidence shown, β1. The pitch, $d_3$, is largest for the largest angle of incidence β2. Further, the larger the divergence, $\phi$, the larger the range in angles of incidence, β. Consequently, the larger the divergence, the larger the range of the pitch.

In some embodiments, the pitch may be determined as follows. For light of wavelength $\lambda$, a single angle of incidence, β, may be assumed. For a single angle of incidence, a single depth of the troughs 124, a duty cycle of fifty percent, and a single pitch for the entire grating, the pitch having a reasonable optical coupling efficiency based on first order theory may given by: $\lambda/(n_{eff} - n_2 \sin \beta)$, where $n_2$ is the refractive index of the cladding and $n_{eff}$ is the effective refractive index of a waveguide with the grating. However, such a pitch is limited by the assumption of a single angle of incidence as using first order terms only. For multiple angles of incidence, the coupling efficiency for the entire beam decreases because different portions of the beam of light 140 have different angles of incidence.

For a nonlinear grating, the differences in angles of incidence may be at least partially accounted for by changing the pitch. In some embodiments, the angle of incidence for a region of the grating may be used to provide a pitch for that region. For example, $d_1$ may be approximated by $\lambda/(n_{eff} - n_2 \sin \beta 1)$; $d_2$ may be approximated by $\lambda/(n_{eff} - n_2 \sin \beta 2)$; and $d_3$ may be approximated by $\lambda/(n_{eff} - n_2 \sin \beta 3)$. Note that for a shallow troughs 124 or weak coupling, $n_{eff}$ may be approximated by the waveguide without the grating 100. However, in many applications such as an EAMR head that has a stronger coupling or a higher depth troughs 124, further numerical analysis may be used. For example, higher order correction terms, other approximations, and/or other calculations might be used to determine a pitch in a region, the desired range of pitches, or how the pitch is to vary across the grating 100. In general, however, the relationship above between wavelength, angle of incidence, and pitch may be used to provide a nonlinear pitch that increases for increasing angles of incidence and increases in wavelength.

As described above, the grating 100 has a nonlinear pitch. More specifically, the pitch of the grating 100 may vary to account for, among other factors, changes in the angle of incidence of the light 140. As a result, the coupling efficiency and angle of alignment tolerance of the grating 100 may be improved. Consequently, performance of devices using the grating 100, such as an EAMR head, may be improved.

Figure 4:
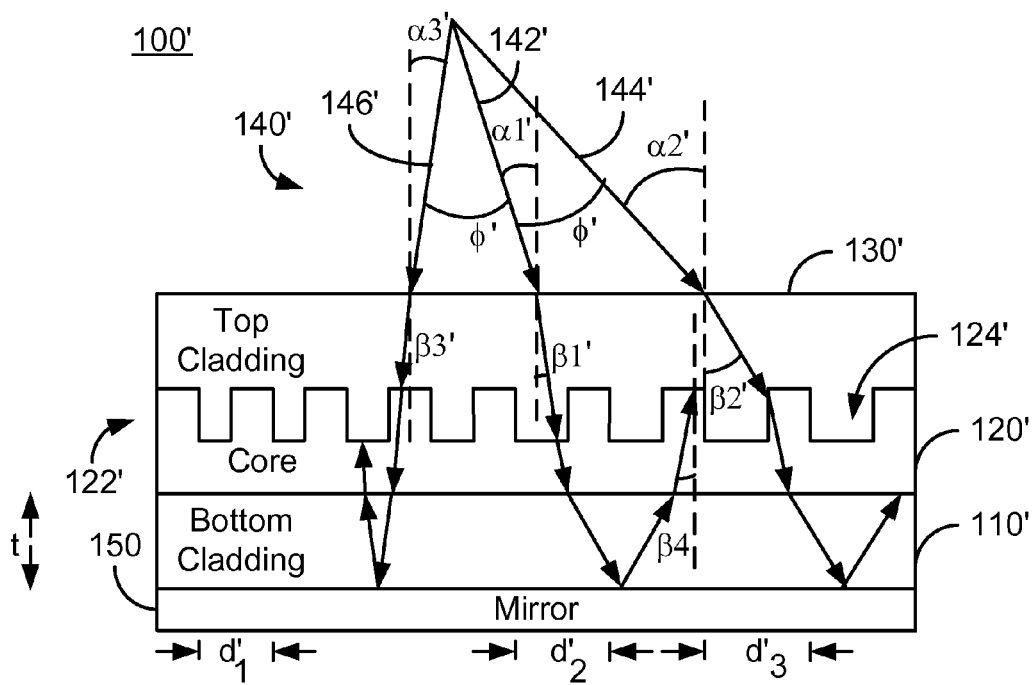
FIG. 4 is a diagram depicting another exemplary embodiment of an optical grating.

FIG. 4 is a diagram depicting another exemplary embodiment of an optical grating 100'. For simplicity, FIG. 4 is not to scale. The grating 100' is analogous to the grating 100. Consequently, analogous components are labeled similarly. The optical grating 100' thus includes a bottom cladding 110', a core 120', and a top cladding 130' analogous to the bottom cladding 110, the core 120, and the top cladding 130, respectively. The light 140' is represented by rays 142', 144', and 146' having angles of incidence α1', α2', and α', respectively, with respect to the top cladding 130' and angles of incidence β1', β2', and β3', respectively, with respect to the core 120'. The light 140' also has a divergence, $\phi'$. The core 120' has a pitch corresponding to the ridges 122' interleaved with troughs 124'. The pitch of the core 120' is nonlinear, as described above. Thus, the pitch may vary across the grating 100'. The nonlinear pitch is, therefore, $d_1'$, $d_2'$, $d_3'$, or another value depending upon the location in the grating 100'. In the embodiment shown, the pitch increases with increasing angle of incidence and increasing wavelength. In the grating 100' shown, the pitch increases monotonically along the grating 100'. However, in other embodiments, the pitch may vary in another way depending upon factors such as the angle of incidence.

The grating 100' also includes a mirror 150. The bottom cladding 110' resides between the mirror 150 and the core 120'. The mirror 150 may be used to improve the efficiency of the grating 100' by recirculating, or recycling, the light 140. More specifically, as shown in FIG. 4, the rays 142', 144', and 146' traverse the core 120' and bottom cladding 110', reflect off of the mirror 150, and return to the core 120'. For example, the ray 142' enters the grating at angle of incidence α1', traverses the top cladding 130', enters the core 120' at angle of incidence β1', traverses the core 120', crosses the bottom cladding 130', reflects off of the mirror 150, and returns to the pitch of the core 120' with reflected angle of incidence β4. Thus, energy from the ray 142 has another opportunity to be coupled into the device via the core 120'. Similarly, the energy from ray 146' has an additional opportunity to be coupled into the device. In the embodiment shown, the some of the light 140' does not reflect back into the core 120'. However, in other embodiments, all of the light 140' may be recirculated back to the core 120'.

The thickness of the bottom cladding 120' may be configured such that recycled light returns to a portion of the core 120' having a pitch corresponding to the reflected angle of incidence. In other words, recycled light having a larger reflected angle of incidence is incident on the core 120' where the pitch is larger. As can be seen in the geometry of the grating 100', the thicker the bottom core 110', the larger the distance between the location at which the light 140' is incident on the core 120' when traveling from the top cladding 130' and the location at which the light 140' is incident on the core 120' when traveling from the bottom cladding 110'. For example, in the case of the central ray 142', the reflected angle of incidence β4 is larger than the angle of incidence β1'. The pitch of the ridges 122'/troughs 124' in this region is larger than the pitch $d_2'$ corresponding to the angle β1'. Thus, the thickness, t, has been set such that the recycled light reflected from the mirror 150 returns to the ridges 122/troughs 124' at a region that is more appropriate for the reflected angle of incidence, β4. Thus coupling efficiency of the grating 100' may be further improved.

Figure 5:
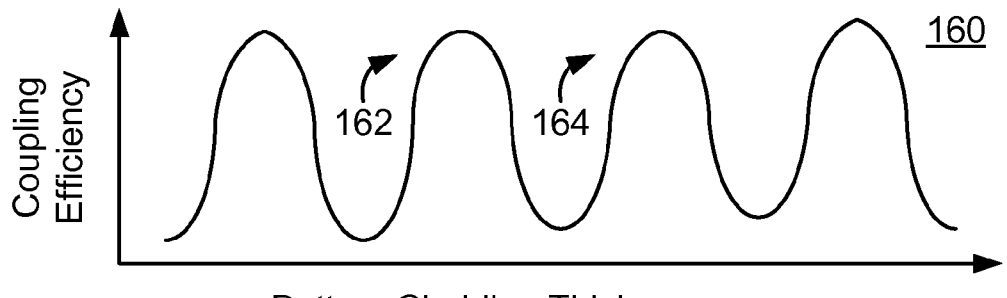
FIG. 5 is a diagram depicting the relationship between the coupling efficiency due to recirculation and the thickness of the bottom cladding.

FIG. 5 is a diagram depicting the relationship between the coupling efficiency due to recycling of light and the thickness of the bottom cladding. FIG. 5 is described in connection with the grating 100'. The graph 160 indicates the coupling efficiency due to recycled light reflected off of the mirror 150. The graph 160, however, is for exemplary uses only and is not intended to represent a particular grating. As can be seen in FIG. 5, the coupling efficiency varies periodically with thickness of the bottom cladding. Thus, in some embodiments, the thickness of the bottom cladding 110' is desired to be in the region 162 or 164, near where the coupling efficiency is larger. Thus, setting the thickness of the bottom cladding 110' may improve recycling using the grating 100'. In some embodiments, the thickness of the bottom cladding 110' may be on the order of seven six hundred eighty to seven hundred twenty nanometers for light having a wavelength of eight hundred thirty nanometers.

Figure 6:
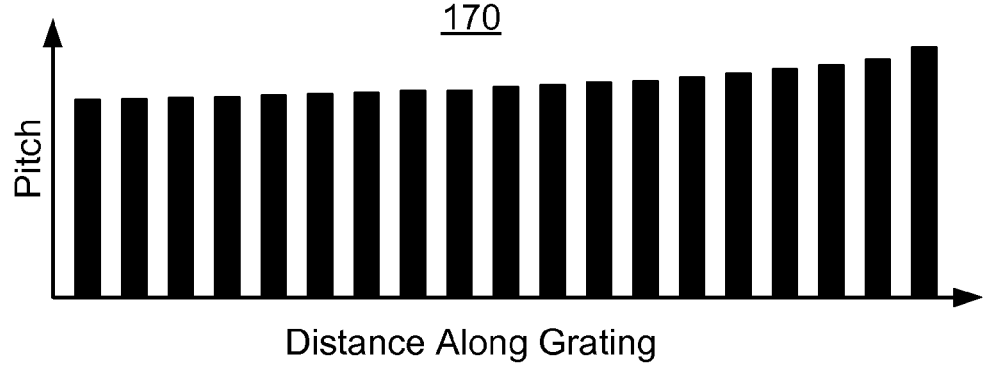
FIG. 6 is a diagram depicting the relationship between the pitch and the distance along the grating in one embodiment of an optical grating.

FIG. 6 is a diagram depicting the relationship between the pitch and the distance along the grating in one embodiment of an optical grating. FIG. 6 is described in connection with the grating 100'. The bar graph 170 indicates the variation in the pitch of the ridges 122'/troughs 124' at a particular distance along the grating. Thus, the pitch, or distance between ridges 122', increases along the grating. The graph 170, however, is for exemplary uses only and is not intended to represent a particular grating.

Like the grating 100, the pitch of the grating 100' is nonlinear. In some embodiments, the pitch varies such that light 140' from the top cladding 130' having a larger angle of incidence is incident on a region of the ridges 122'/troughs 124' having a larger pitch. Thus, optical efficiency of the grating 100' is improved. The presence of the mirror 150 allows light to be recycled, traveling through the core 120' at least twice. Light has multiple opportunities to be coupled by the grating and eventually into a waveguide. Thus, optical efficiency may be improved. In addition, the thickness of and material for the bottom cladding 110' may be selected such that recycled light reflected from the mirror 150 may be incident upon a region of the grating 100' having a pitch that better corresponds to the reflected angle of incidence. The coupling efficiency for recycled light may be improved. Consequently, performance of the grating 100' may be improved. As a result, the grating 100' may improve the performance and efficiency of the device in which the grating 100' is used.

Figure 7:
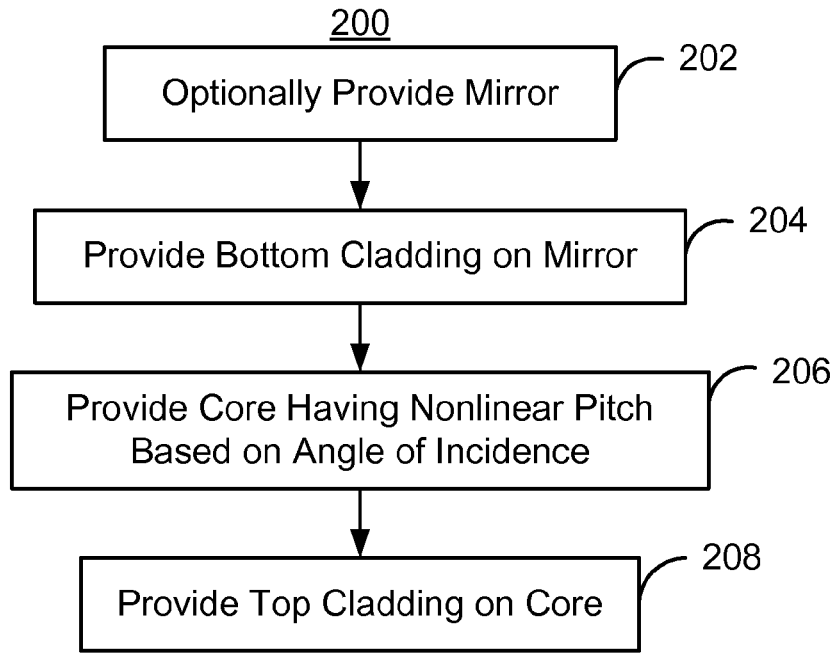
FIG. 7 is a flow chart depicting an exemplary embodiment of a method for fabricating a grating.

FIG. 7 is a flow chart depicting an exemplary embodiment of a method 200 for fabricating a grating. Although certain steps are shown, some steps may be omitted, interleaved, and/or combined. The grating being fabricated may be used in an optical system such as EAMR head that resides on a slider (not shown) in a disk drive. Thus, the method 200 may be part of a method used in fabricating an EAMR head. The method 200 also may commence after formation of other portions of the EAMR head. The method 200 is also described in the context of providing a single grating. However, the method 200 may be used to fabricate multiple gratings at substantially the same time. The method 200 is also described in the context of particular layers. However, in some embodiments, such layers may include multiple sub-layers. The grating fabricated using the method 200 is configured for a particular wavelength. Thus, the grating operates for light in a range around the wavelength. For example, in one embodiment, the grating being fabricated is configured for 830 nm light. In other embodiments, the wavelength may differ. For example, gratings for wavelengths of nine hundred nanometers or more might be fabricated. The method 200 is also described in the context of the gratings 100/100'. However, the method 200 may be used for fabricating other components.

The mirror 150 may optionally be provided, via step 202. Step 202 may include depositing a reflective material, such as a metal, and/or planarizing the surface. The bottom cladding 110/110' may be provided on the mirror 150, via step 204. Step 204 may include depositing a layer of aluminum oxide or other optically transparent material. Further, step 204 may also include setting the thickness of and material for the bottom cladding 110/110' to improve the efficiency of the recycled light.

The core 120/120' is provided, via step 206. For example, step 206 may include depositing the material, such as $Ta_2O_5$ or other optically transparent material, and then removing portions of the material to form the trenches 124/124' and the ridges 122/122'. Step 206 is carried out such that the pitch is nonlinear. Thus, the trenches 124/124' may have different widths.

The top cladding 130/130' is provided, via step 208. Step 208 thus includes depositing a material, such as aluminum oxide, on the core 120/120'. Step 208 may also include performing a planarization, such as a CMP.

Using the method 200, the optical gratings 100 and/or 100' may be fabricated. Consequently, the benefits of the optical gratings 100 and/or 100' may be obtained.

Figure 8:
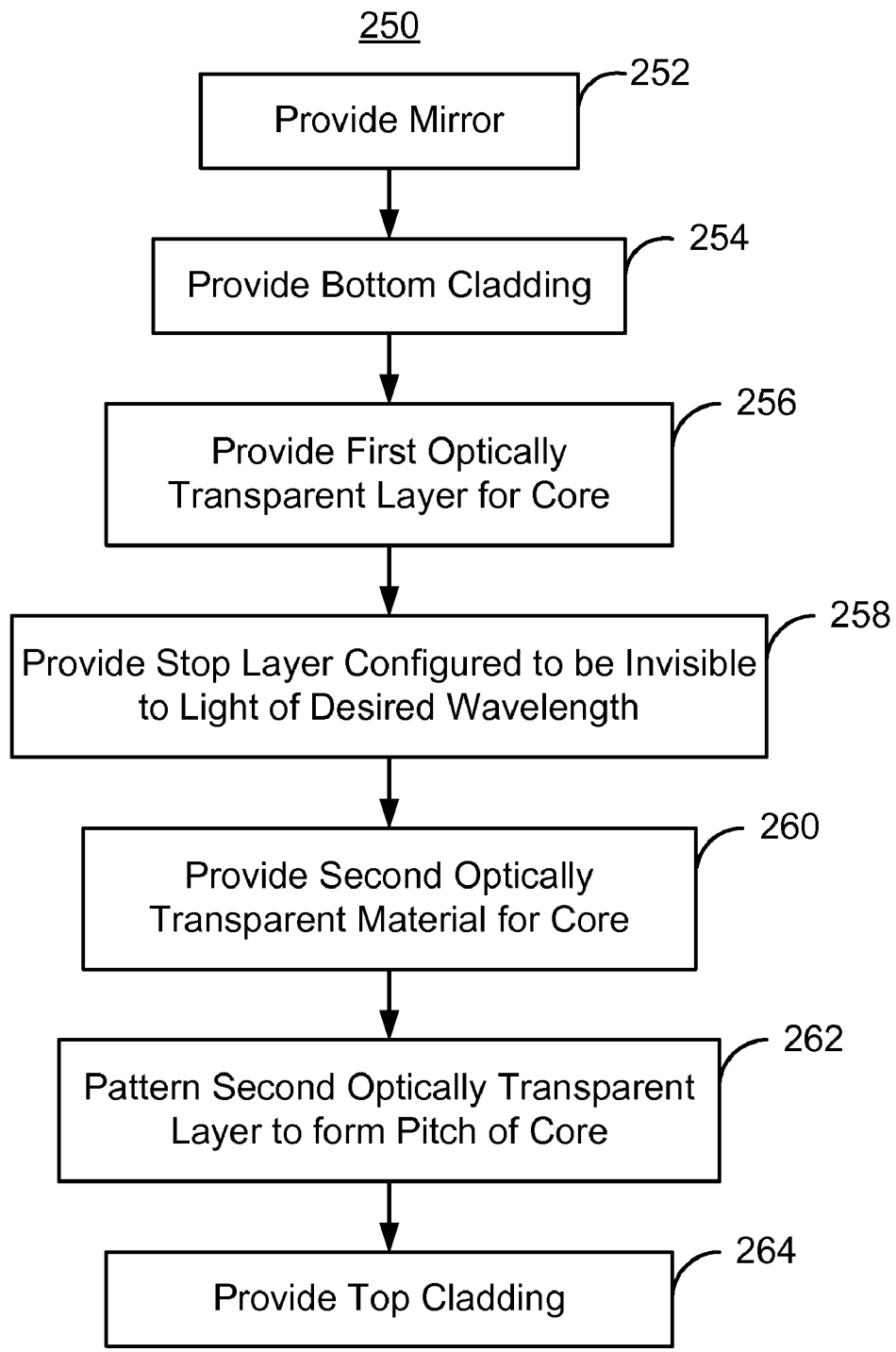
FIG. 8 is a flow chart depicting another exemplary embodiment of a method for fabricating a grating.

FIG. 8 is a flow chart depicting another exemplary embodiment of a method 250 for fabricating an optical grating. Although certain steps are shown, some steps may be omitted, interleaved, or combined. FIGS. 9-14 are diagrams depicting side views of an exemplary embodiment of a portion of an optical grating 300 during fabrication. For clarity, FIGS. 9-14 are not to scale. Referring to FIGS. 8-14, the method 250 is described in the context of the grating 300. However, the method 250 may be used to form another device (not shown). Further, the method 250 may be part of another method used in forming an EAMR head. The method 250 may thus commence after formation of other portions of the EAMR transducer of which the grating 300 is a part. The method 250 is also described in the context of providing a single grating 300. However, the method 250 may be used to fabricate multiple gratings at substantially the same time. The method 250 and grating 300 are also described in the context of particular layers. However, in some embodiments, such layers may include multiple sublayers. Further, the grating fabricated using the method 250 is configured for a particular wavelength. Thus, the grating operates for light in a range around the wavelength. For example, in one embodiment, the grating being fabricated is configured for 830 nm light. In other embodiments, the wavelength may be different.

Figure 9:
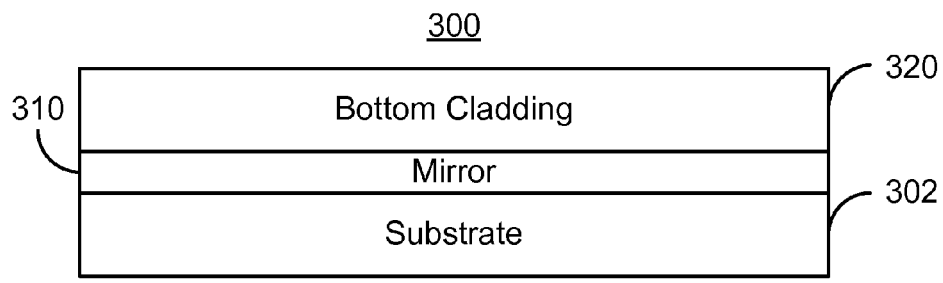
FIGS. 9-14 are diagrams depicting an exemplary embodiment of a grating during fabrication.

A mirror is provided, via step 252. Step 252 may include depositing a reflective material, such as a metal, and/or planarizing the surface. The bottom cladding may be provided on the mirror, via step 254. Step 254 may include depositing a layer of aluminum oxide or other optically transparent material. Further, step 254 may include setting the thickness of and materials for the bottom cladding 110/110' to improve the efficiency of the recycled light. FIG. 9 depicts the grating 300 after step 254 is performed. Consequently, the mirror 310 and bottom cladding 320 have been formed on the substrate 302. The substrate 302 may include other components on which the grating 300 is fabricated.

Figure 10:
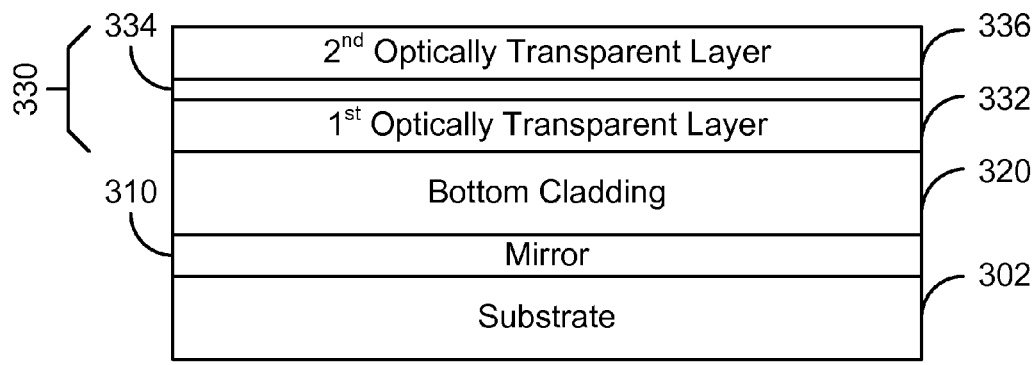

Steps 256, 258, 260, and 262 are used to provide a core as well as ridges interleaved with troughs for the grating 300. A first optically transparent layer is provided on the bottom cladding, via step 256. The first optically transparent layer has a different index of refraction than the bottom cladding 320. The first optically transparent material may, for example include $Ta_2O_5$. A stop layer is provided, via step 258. The stop layer is configured to be invisible to light having the wavelength for which the grating 300 is meant to be used. In some embodiments, this corresponds to the stop layer having a thickness of not more than ten percent of the wavelength of the light to be used. The stop layer is a stop layer for the removal process used in step 262. For example, aluminum oxide might be used as the stop layer in step 258. A second optically transparent layer is provided on the stop layer, via step 260. The second optically transparent layer has a different index of refraction than the top cladding, described below. In some embodiments, the thickness of the second optically transparent layer may be the desired thickness of the troughs/ridges of the grating 300. FIG. 10 depicts the grating 300 after step 260 is performed. Thus, the first optically transparent layer 332, the stop layer 334 and the second optically transparent layer 336 for the core 330 have been provided.

Figure 11:
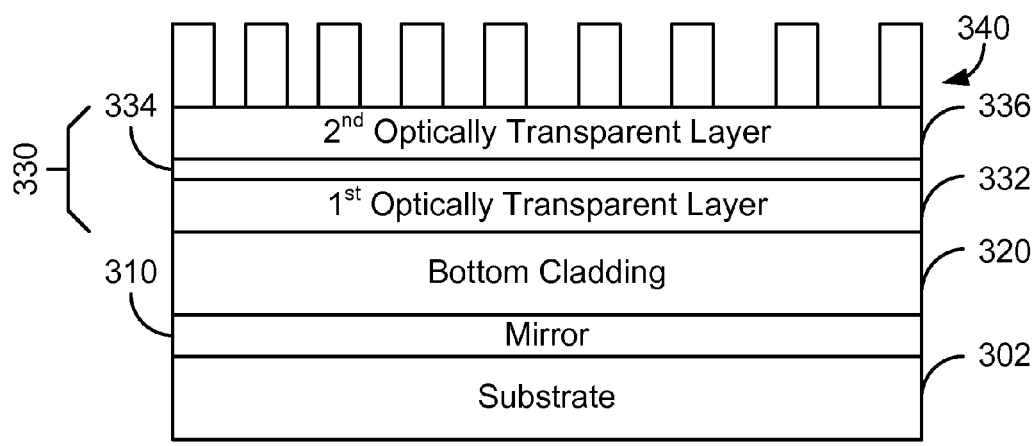
Figure 12:
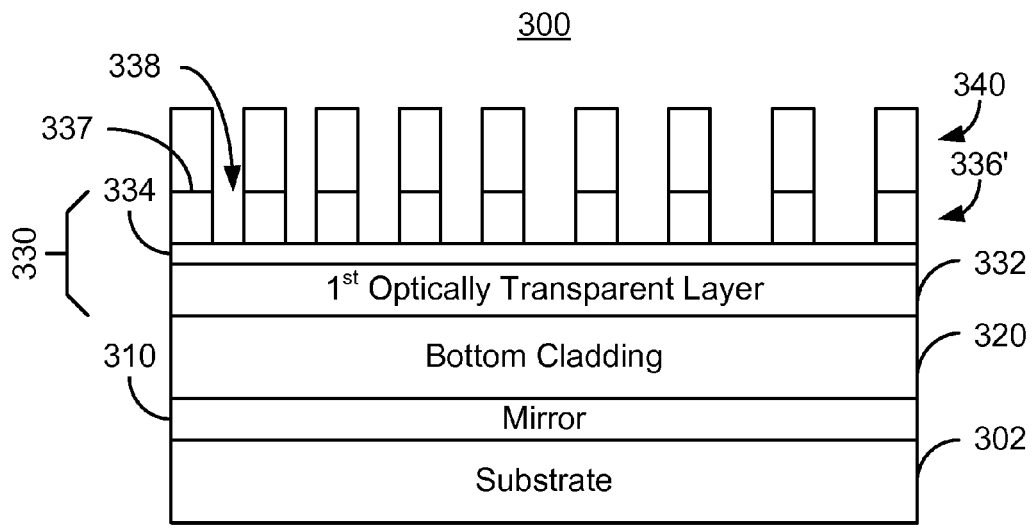
Figure 13:
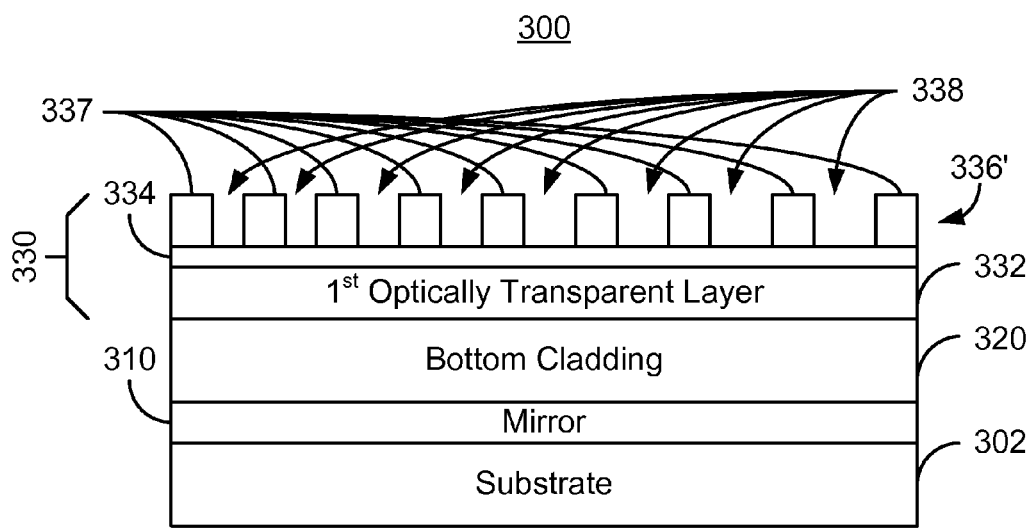

A portion of the second optically transparent layer is removed, via step 262. Step 262 uses a removal process. The stop layer provided in step 268 is a stop for the removal process. Step 262 may include providing a mask. FIG. 11 depicts the grating 300 with a mask 340 formed on the second optically transparent layer. A removal process, such as a $Ta_2O_5$ etch, may then be used to remove portions of the second optically transparent layer 336 expose by the mask 340. FIG. 12 depicts the grating 300 after portions of the second optically transparent layer have been removed. Thus, the second optically transparent layer 336' includes discrete ridges 337 interleaved with troughs 338. In the embodiment shown, the bottoms of the troughs 338 are formed at least in part by the stop layer 337. Thus, the height of the troughs 338/ridges 337 is consistent and equal to the thickness of the second optically transparent layer 336'. However, in another embodiment, the removal process used need not etch through the second optically transparent layer 336'. The mask may then be removed as part of step 262. FIG. 13 depicts the grating 300 after step 262 is performed. Thus, the core 330 now includes ridges 337 interleaved with troughs 338.

Figure 14:
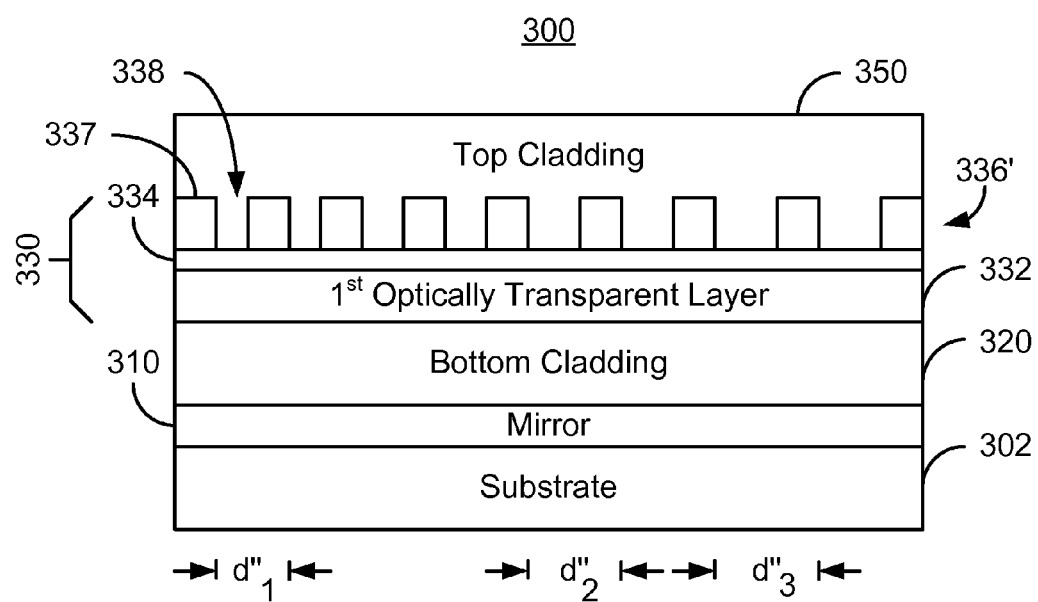

The top cladding is provided, via step 264. Step 264 includes depositing another optically transparent layer. The index of refraction of the top cladding may be different from that of the second optically transparent layer 336'. For example, the top cladding may include aluminum oxide. FIG. 14 depicts the grating 300 after step 264 is performed. Thus, the top cladding 350 has been provided.

Using the method 250, the grating 300 may be fabricated. Because the core 330 includes layers 332, 334 and 336', the height of the troughs 338/ridges 337 is consistent. Stated differently use of the stop layer 334 allows the removal process of step 262 to provide a core 330 having a pitch of consistent depth. Further, the use of the stop layer 334 allows the nonlinear pitch of the grating 300 to vary along the grating 300. More particularly, the pitch varies between d1", through d2" to d3". Thus, a pitch that corresponds to the angle of incidence may be provided. This flexibility and improved optical efficiency may be provided without the stop layer 334 adversely affecting performance of the grating 300. This benefit is provided because the stop layer 334 is configured to be invisible to the light used with the gratings 300. Thus, manufacturability as well as performance of the grating 300 may be improved.

We claim:

1. An optical grating configured for light of a wavelength, the optical grating comprising:
 a top cladding;
 a core having a plurality of discrete ridges spaced apart by a nonlinear pitch, the light traversing the top cladding before the core and having a plurality of angles of incidence with the core, the nonlinear pitch being larger for a larger angle of incidence of the plurality of angles of incidence, the core further including a first optically transparent layer, a stop layer on the first optically transparent layer and a second optically transparent layer on the stop layer, the first optically transparent layer being continuous and including a material, the stop layer being configured to be invisible to the light, and the second optically transparent layer including the material and the plurality of discrete ridges;
 a bottom cladding, the core residing between the bottom cladding and the top cladding; and
 a mirror, the bottom cladding residing between the core and the mirror.

2. The optical grating of claim 1 wherein the plurality of angles of incidence correspond to a beam divergence for the light.

3. The optical grating of claim 1 wherein the nonlinear pitch increases with wavelength.

4. The optical grating of claim 1 wherein the bottom cladding has a thickness configured to recirculate the light reflecting off of the mirror to be returned to a portion of the core at a reflected angle of incidence, the nonlinear pitch at the portion of the core corresponding to the reflected angle of incidence.

5. The optical grating of claim 1 wherein the plurality of discrete ridges are interleaved with a plurality of troughs, each of the plurality of troughs having a bottom including a portion of the stop layer.

6. The optical grating of claim 1 wherein the stop layer has a thickness of not more than ten percent of the wavelength.

7. The optical grating of claim 1 wherein the plurality of angles of incidence correspond to a principal angle of incidence and a divergence.

8. The optical grating of claim 7 wherein the nonlinear pitch has a range, the range being larger for the divergence being larger.

9. The optical grating of claim 1 wherein the core has a thickness of at least 120 nm and not more than two hundred nanometers.

10. The optical grating of claim 1 further comprising:
a mirror, the bottom cladding residing between the core and the mirror.

11. An optical grating configured for light of a wavelength, the optical grating comprising:
a top cladding;
a core having a core thickness and a plurality of discrete ridges spaced apart by a nonlinear pitch, the light traversing the top cladding before the core and having a plurality of angles of incidence with the core, the nonlinear pitch being larger for a larger angle of incidence of the plurality of angles of incidence, the plurality of angles of incidence corresponding to a principal angle and a divergent, the nonlinear pitch having a range that is larger for the divergence being larger, the core thickness being at least one hundred twenty and not more than two hundred nanometers;
a bottom cladding having a bottom cladding thickness, the core residing between the bottom cladding and the top cladding; and
a mirror, the bottom cladding residing between the core and the mirror, the bottom cladding thickness configured to recirculate the light reflecting off of the mirror to be returned to a portion of the core at a reflected angle of incidence, the nonlinear pitch at the portion of the core corresponding to the reflected angle of incidence.

12. A method for providing an optical grating configured for light of a wavelength, the optical grating comprising:
providing a bottom cladding;
providing a core having a plurality of discrete ridges spaced apart by a nonlinear pitch, the light having a plurality of angles of incidence with the core, the nonlinear pitch being larger for a larger angle of incidence of the plurality of angles of incidence, the step of providing the core further including providing a first optically transparent layer, providing a stop layer on the first optically transparent layer and providing a second optically transparent layer on the stop layer, the first optically transparent layer being continuous and including a material, the stop layer being configured to be invisible to the light, and the second optically transparent layer including the material and the plurality of discrete ridges; and
a top cladding, the core residing between the bottom cladding and the top cladding, the light traversing the top cladding before the core.

13. The method of claim 12 wherein the plurality of angles of incidence correspond to a beam divergence for the light.

14. The method of claim 12 wherein the nonlinear pitch increases with wavelength.

15. The method of claim 12 wherein the bottom cladding has a thickness configured to recirculate the light reflecting off of the mirror to be returned to a portion of the core at a reflected angle of incidence, the nonlinear pitch at the portion of the core corresponding to the reflected angle of incidence.

16. The method of claim 12 wherein the plurality of discrete ridges are interleaved with a plurality of troughs, each of the plurality of troughs having a bottom including a portion of the stop layer.

17. The method of claim 12 wherein the stop layer has a thickness of not more than ten percent of the wavelength.

18. The method of claim 12 wherein the plurality of angles of incidence correspond to a principal angle of incidence and a divergence.

19. The method of claim 18 wherein the nonlinear pitch has a range, the range being larger for the divergence being larger.

20. The method of claim 12 further comprising:
providing a mirror, the bottom cladding residing between the core and the mirror.

* * * * *